(12) United States Patent
Knupfer et al.

(10) Patent No.: US 6,396,587 B1
(45) Date of Patent: May 28, 2002

(54) METHOD FOR RECORDING DEPTH PROFILES IN A SPECIMEN AND APPARATUS THEREFOR

(75) Inventors: Klaus Knupfer, Essingen; Christoph Hauger, Aalen, both of (DE)

(73) Assignee: Carl-Zeiss-Stiftung, Heidenheim-Brenz (DE)

( * ) Notice: Subject to any disclaimer, the term of this patent is extended or adjusted under 35 U.S.C. 154(b) by 173 days.

(21) Appl. No.: 09/599,523

(22) Filed: Jun. 23, 2000

(30) Foreign Application Priority Data

Jun. 26, 1999 (DE) .......................... 199 29 406

(51) Int. Cl.[7] ................................ G01B 9/02
(52) U.S. Cl. ...................................... 356/479
(58) Field of Search ................. 356/477, 479, 356/497, 496, 511; 250/559.19

(56) References Cited

U.S. PATENT DOCUMENTS

| | | | | |
|---|---|---|---|---|
| 5,555,086 A | * | 9/1996 | vonBieren et al. | 356/479 |
| 5,877,856 A | | 3/1999 | Fercher | 356/497 |
| 6,268,921 B1 | * | 7/2001 | Seitz et al. | 356/497 |

FOREIGN PATENT DOCUMENTS

| | | |
|---|---|---|
| DE | 3201801 | 9/1983 |
| WO | WO 92/19930 | 11/1992 |
| WO | WO 98/38907 | 9/1998 |

OTHER PUBLICATIONS

Optical coherence tomography with the "Spectral Radar" —Fast optical analysis In volume scatterers by short coherence interferometry by M. Bail et al, SPIE, vol. 2925, 1996, pp. 298 to 303.

"Optical Coherence Tomography" by D. Huang et al, Science, vol. 254, No. 5035, pp. 1178 to 1181, Nov. 1991.

* cited by examiner

Primary Examiner—Samuel A. Turner
(74) Attorney, Agent, or Firm—Walter Ottesen

(57) ABSTRACT

An apparatus records the depth profiles in a specimen with a reference beam and with a device for spatially superposing the measuring beam reflected from the specimen with the reference beam. The reference beam is coherent to the measuring beam in respect to a reference point of time. An evaluation unit having a detector is assigned to this device. The reference beam (9) and the measuring beam (7) for an areal irradiation of a sensor surface (29) are arranged at a spacing (35) from each other. The sensor surface (29) is assigned to the detector (25) and the surface irradiation overlaps at least in a subregion (27).

12 Claims, 2 Drawing Sheets

METHOD FOR RECORDING DEPTH PROFILES IN A SPECIMEN AND APPARATUS THEREFOR

FIELD OF THE INVENTION

The invention relates to a method and apparatus for recording depth profiles in a specimen. The specimen is illuminated with a measuring beam for recording a depth profile. The radiation, which is reflected from the specimen, is spatially superposed with the radiation of a reference beam. An interference pattern results from the superposition. The radiation intensity of the interference pattern is recorded with a detector and is supplied to an evaluation unit.

BACKGROUND OF THE INVENTION

Apparatus and methods are known which include a Michelson interferometer having a measuring branch and a reference branch. In this connection, reference can be made, for example, to the following: German patent publication 3,201, 801; published international patent application WO 92/19930; and, the article of D. Huang et al entitled "Optical Coherence Tomography" and published in Science, Volume 254, pages 1178 to 1181, of Nov. 22, 1991. In the above-mentioned Michelson interferometers, the radiation of the measuring branch, which is reflected from the specimen, is superposed with the radiation of the reference branch. The path, which the radiation traverses in the reference branch, is modulated. Light sources, which are incoherent over time and which are multispectral, are provided as light sources and include, for example, incandescent lamps, gas-discharge lamps and laser diodes. With the superposition of the radiation, interference phenomena only occur for identical optical path lengths of reference branch and measuring branch. A profile of the specimen is recorded because of the variation of the optical path length in the reference branch. This is so because only the radiation, which is reflected in the corresponding depth of the specimen, interferes with the radiation of the reference branch.

It is disadvantageous in these methods that a movable element is required in the reference branch for the modulation of the optical path. The time span, which is required for recording a depth profile, is given by the modulation velocity. In this way, the time, which is required to record a depth profile, is dependent upon the scanning velocity of the moved element. A movement of the specimen should be prevented during a recording of a depth profile because otherwise, the allocation of the measuring point of the depth profile to the corresponding measuring point in the specimen is only possible while considering the movement of the specimen. However, a three-dimensional recording of a specimen is thereby almost impossible insofar as the movement the specimen is not controllable. For this reason, recordations of a living specimen can only be carried out to a limited extent or with limited accuracy. The required illumination time is of critical significance especially for living specimens.

It is known to measure depth profiles of a specimen in that a very broadband source is utilized as a light source as disclosed in the article of M. Bail entitled "Fast Optical Analysis in Volume Scatterers by Short Coherence Interferometry" published in SPIE, Volume 2925, pages 298 to 303, 1996. Here, the radiation, which emanates from the light source, is split by a beam splitter into a measurement beam and into a reference beam. The radiation of the reference branch traverses different optical paths in the transmission through a greatly dispersive medium arranged in the reference branch. The optical paths are different in dependence upon the particular wavelength in the reference branch. Thereafter, the radiation of the reference path is superposed with the radiation reflected from the specimen. The beam formed in this manner is spatially split according to wavelengths by a prism mounted in the beam path. A conclusion can be drawn as to the reflectivity at the corresponding depths of the specimen from the detection of the intensity in dependence upon the wavelength assigned to this position.

There are specimens wherein the reflectivity is greatly dependent upon the wavelength of the in-radiating light. In these specimens, it is disadvantageous in this method that an is investigation in profile depths (which have a wavelength assigned thereto which exhibits only a negligible reflectivity referred to the medium to be investigated) is not possible in this profile depth. Further, the maximum scanning depth or profile depth is limited by the strongly dispersive medium and especially the dispersivity of the medium. From this results that it can be necessary that the reference beam must traverse long paths in the dispersive medium in order to achieve an acceptable scanning range via a corresponding splitting of the radiation in dependence upon the wavelength in the reference branch.

In addition to the foregoing, providing a corresponding broadband light source is only possible to a limited extent.

SUMMARY OF THE INVENTION

It is an object of the invention to provide a method and an apparatus wherein the measurement of depth profiles by means of very short light pulses is possible. It is another object of the invention to provide an apparatus and method for measuring depth profiles wherein no movable elements are needed in the reference branch.

The arrangement of the invention is for recording a depth profile in a specimen. The arrangement includes: an optical device for generating a measuring beam directed onto and reflected from the specimen and for generating a reference beam coherent to the measuring beam in respect to a reference point of time; a detector including a sensor device defining a sensor surface; a first optic for conducting the measuring beam reflected from the specimen along a first path to irradiate at least a first portion of the sensor surface; a second optic for conducting the reference beam along a second path to simultaneously irradiate at least a second portion of the sensor surface; the first and second optics being spaced from each other so as to cause the first and second portions to overlap to provide an interference effect representative of the depth profile; and, an evaluation unit connected to the detector for evaluating the interference effect.

According to a feature of the invention, a reference beam and a measuring beam are arranged so as to be spaced from each other. With this feature, a sensor surface, which is assigned to a detector, is irradiated on a subregion thereof simultaneously by the reference beam and the measuring beam. In this way, a method and an apparatus are provided with which the recording of depth profiles is possible with very short exposure times. The overlapping region defines a depth profile. In this method and apparatus, no movable parts are required for modulating the optical path in the reference branch because different optical paths of the respective radiation are traversed to the sensor surface because of the irradiation over an area referred to a beam output assigned to the particular beam. The measuring point in the corresponding depth of the specimen results from the difference of the different paths for the radiation of the reference branch and of the measuring beam to the sensor surface. In this way, a constructive interference of the corresponding radiation results.

The above subregion is simultaneously irradiated by the reference beam and the measuring beam. The interference phenomena occurring on this subregion provide information as to the reflectivities of the specimen and its nature at the corresponding depths.

It has been shown to be advantageous to assign an optic to the measuring beam and the reference beam by means of which the particular beam is expanded so that the sensor surface is irradiated by each beam over the largest possible area. The maximum scanning depth in the specimen is fixed in dependence upon the maximum difference of the optical paths from the beam output of the respective beam up reaching the sensor surface.

It has also been shown to be advantageous to guide the measuring beam and the reference beam in fibers or light conductors (preferably monomode fibers). Each of the fibers are provided at their respective ends with an optic for expanding the particular beam. The light conductors are each provided with an optic for making available a high aperture and/or for expanding the beam. Such light conductors are already available as cost-effective standard components.

In some embodiments, it has been shown to be advantageous to provide a single optic for the expansion of the measurement and reference beams. If the sensor surface is configured in the form of a sensor line (that is, a plurality of sensors arranged along a line), it has been shown to be advantageous to provide an optic for focusing the radiation of the measuring beam and the reference beam on this sensor line. An expansion of the respective beams in the direction in which the sensor line extends is retained so that the largest possible component region is irradiated simultaneously by the measurement and reference beams.

Providing a sensor line is advantageous for reducing costs because all data of a depth profile are obtained by a single sensor line.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
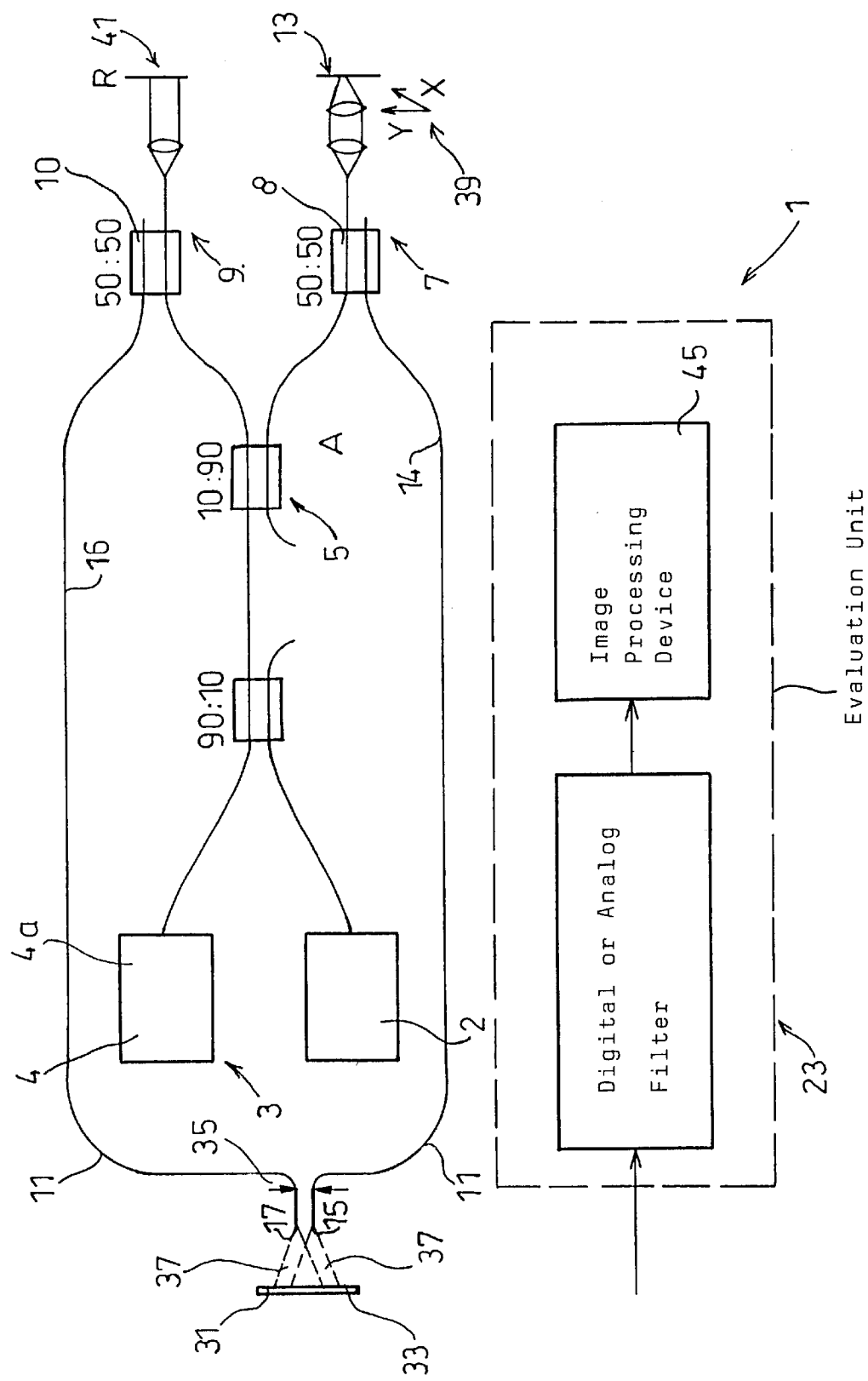
FIG. 1 is a schematic representation of an apparatus of the invention for measuring depth profiles.

Referring to FIG. 1, the configuration of an apparatus 1 for measuring depth profiles will first be described. This apparatus 1 includes a superluminescence diode 4a as a radiation source which emits radiation incoherent over time. This superluminescence diode 4a defines a white light source 4. The radiation emitted by the superluminescence diode 4a is mixed with radiation from a laser diode 2. The laser diode 2 emits radiation, which is coherent over time, in the frequency range visible to the human eye. This laser diode 2 is provided in order to be able to follow the beam trace of the radiation of the diode 4a outputted in the non-visible range. 90% of the radiation intensity of the beam, which is formed in this way, originates from the superluminescence diode 4a and 10% from the laser diode 2. It is understood that other mixture ratios can be selected. This radiation is divided with a beam splitter 5 into a reference branch 16 or reference beam 9 and into a measuring branch 14 or measuring beam 7. 10% of the radiation intensity is coupled into the reference beam 9 and the remaining 90% is coupled into measuring beam 7.

In the embodiment shown, a mixer 10 is assigned to the reference beam 9 by means of which 50% of the incoupled radiation is mixed with 50% of the radiation reflected from a mirror 41 mounted in the reference branch 16. The radiation of the reference branch 16 prepared in this manner is conducted by means of a light conductor 11 to a beam output 17 of the reference branch 16. Monomode fibers are especially used as light conductors 11. With monomode fibers, the optical path length of the reference branch 16 is fixed with high accuracy and is known.

50% of the radiation 7, which is coupled into the measuring branch 14, is likewise mixed by a mixer 8 with the radiation reflected from the specimen 13 mounted in the measuring branch 14 and is likewise conducted via a light conductor 11 to a beam output 15. These two beam outputs 15 and 17 are arranged so as to be spaced from each other. From each beam output (15, 17), a cone of light 37 emanates which is directed onto a CCD line 33 of a detector 25. The CCD line 33 is provided as a sensor surface 29 to be illuminated. The light cones 37 emanate from the beam outputs (15, 17) of the measuring beam and reference beam (7, 9), respectively. A subregion 27 of the CCD line 33 is simultaneously illuminated by these light cones 37. Interference phenomena occur only for identically traversed optical paths of the radiation 9 of the reference branch 16 and the radiation 7 of the measuring branch 14. Accordingly, a depth profile of the specimen to be investigated is derived via the detection of the radiation intensity in the subregion 27 by evaluating the different path lengths to be traversed from the respective beam outputs (15, 17) to the respective locations of the CCD line in that the difference of the traversed optical path up to reaching the respective points of the CCD line 33 is applied. The optical paths in the reference branch 16 and in the measuring branch 14 are of identical length under the assumption of a reflection of the radiation in the measuring branch at a predetermined reference point which is preferably the surface of the specimen. The optical path is from the radiation source 3 to the radiation output (15, 17). Starting from the reference point, one obtains the corresponding measuring point at the corresponding depth of the specimen by dividing by two the determined path length difference from the radiation outputs (15, 17) to the sensor line 31 while considering the optical density of the specimen.

The intensities, detected by the CCD line 33 are conducted to an evaluation unit 23 which can be provided with a digital or analog filter. The reflectivities, which are determined by the evaluation unit 23, are graphically displayed by means of an associated image processing device 45.

This method affords the advantage that a very short exposure pulse is sufficient to measure the depth profile because a depth scan is already present by the measurement of the detected intensities of a single CCD line 33. The evaluation can take place later. In this way, movements of the specimen 13 are only included during this very short exposure time and the specimen is influenced only for a short time by the irradiation which is of short duration. The irradiation occurs via the radiation of the light pulse. The evaluation of a CCD line 33 can require a multiple of the exposure time.

In the embodiment shown, a device 39 is mounted forward of the specimen 13. The device 39 can be, for example, a rotatably journalled mirror and makes possible a scanning across the specimen 13. By scanning the specimen 13, a three-dimensional image of the specimen 13 can be prepared.

Figure 2:
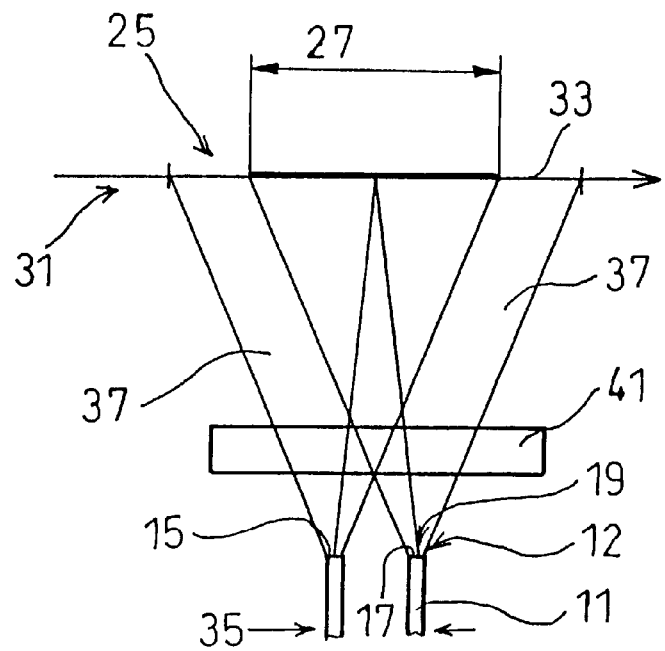
FIG. 2 is a detail schematic of the subregion including the detector.

FIG. 2 shows the following: fiber ends (15, 17) spaced from each other and a CCD line 33 as a sensor surface 29. Between the fiber ends (15, 17) and the CCD line 33, a cylinder lens 43 is provided for focusing the radiation, which emanates from the fiber ends (15, 17), onto the CCD line 33.

Figure 3:
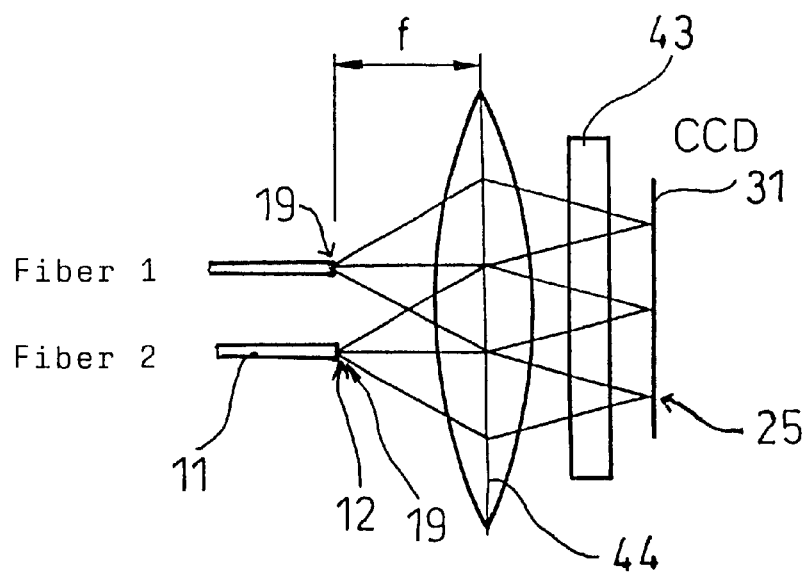
FIG. 3 is a detector having a CCD line.

As shown in FIG. 3, an additional lens 44 can be provided between the fiber outputs (15, 17) and the CCD line 33. With this additional lens 44, a strong periodic interference pattern is generated.

Two points at a spacing of 10 $\mu$m can be resolved if: a pixel size of 10 $\mu$m at 5,000 pixels for a CCD line 33 is assumed and the premise is taken that a light cone 37 (which scans 12° in each case) emanates from the optic 19 such as lenses assigned to the fiber outputs (15, 17) and if it is assumed that as average wavelength of the radiation 800 nm is utilized for the investigation and the fiber ends (15, 17) are arranged at a spacing of 24 cm ahead of the CCD line 33. The fiber ends (15, 17) should be arranged at a spacing of 10 mm to each other. With such an arrangement, a depth stroke of up to 2 mm is possible.

It is understood that the foregoing description is that of the preferred embodiments of the invention and that various changes and modifications may be made thereto without departing from the spirit and scope of the invention as defined in the appended claims.

What is claimed is:

1. An arrangement for recording a depth profile in a specimen, the arrangement comprising:
    an optical device for generating a measuring beam directed onto and reflected from the specimen and for generating a reference beam coherent to said measuring beam in respect to a reference point of time;
    a detector including a sensor device defining a sensor surface;
    a first optic for conducting said measuring beam reflected from the specimen along a first path to irradiate at least a first portion of said sensor surface;
    a second optic for conducting said reference beam along a second path to simultaneously irradiate at least a second portion of said sensor surface;
    said first and second optics being spaced from each other so as to cause said first and second portions to overlap to provide an interference effect representative of said depth profile; and,
    an evaluation unit connected to said detector for evaluating said interference effect.

2. The arrangement of claim 1, said first and second optics including respective lens devices for expanding said measuring and reference beams, respectively.

3. The arrangement of claim 1, said first and second optics including first and second light conductors for conducting said measuring and reference beams, respectively; and, said first and second optics further including a lens device for expanding said measuring and reference beams, respectively.

4. The arrangement of claim 3, wherein said light conductors are respective optical fibers.

5. The arrangement of claim 4, wherein said sensor surface is irradiated by respective light cones emanating from ends of said optical fibers.

6. The arrangement of claim 1, wherein said sensor device is a line of sensors conjointly defining said sensor surface.

7. The arrangement of claim 1, said optical device including: a radiation source for emitting radiation; and, a beam splitter for splitting said radiation into said measuring beam and said reference beam.

8. The arrangement of claim 7, wherein said radiation source is a radiation source for emitting pulsed radiation.

9. The arrangement of claim 7, wherein said radiation source is a white light source.

10. The arrangement of claim 1, wherein said first optic includes a device for spatially scanning said specimen.

11. A method for recording a depth profile in a specimen with an arrangement including an optical device for generating a measuring beam directed onto and reflected from the specimen and for generating a reference beam coherent to said measuring beam in respect to a reference point of time; a detector including a sensor device defining a sensor surface; a first optic for conducting said measuring beam reflected from the specimen along a first path; and, a second optic for conducting said reference beam along a second path; the method comprising the steps of:
    irradiating said specimen with said measuring beam to produce said measuring beam reflected from said specimen;
    irradiating at least a first portion of said sensor surface with said measuring beam;
    simultaneously irradiating at least a second portion of said sensor surface with said reference beam;
    spacing said first and second optics from each other so as to cause said first and second portions to overlap to provide an interference effect representative of said depth profile; and,
    utilizing an evaluation unit connected to said detector to evaluate said interference effect.

12. The method of claim 11, wherein said evaluation unit functions to determine the reflections in the depth layers of said specimen from the radiation intensities recorded via said sensor surface; and, an image processing device is provided for graphically displaying said reflections.

* * * * *